C. MACBETH.
TRANSPORTING SYSTEM PARTICULARLY FOR USE IN CONNECTION WITH THE MANUFACTURE OF TIRES.
APPLICATION FILED JUNE 9, 1919.
1,410,821.
Patented Mar. 28, 1922.
5 SHEETS—SHEET 1.
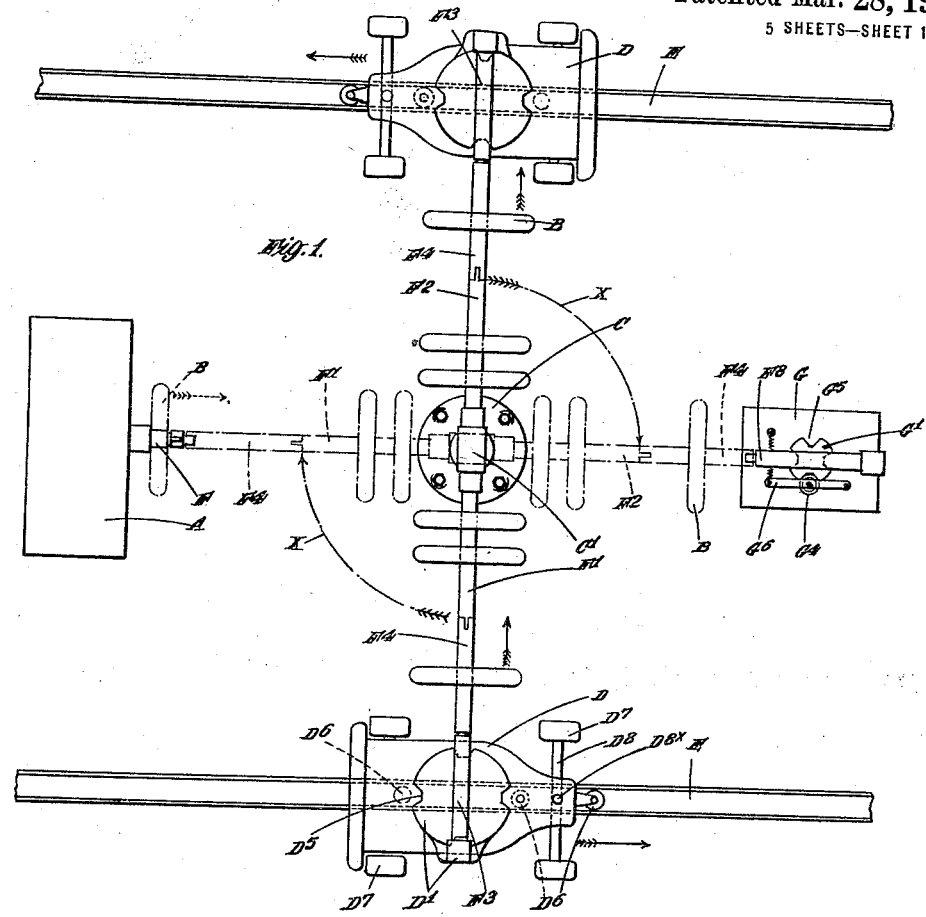
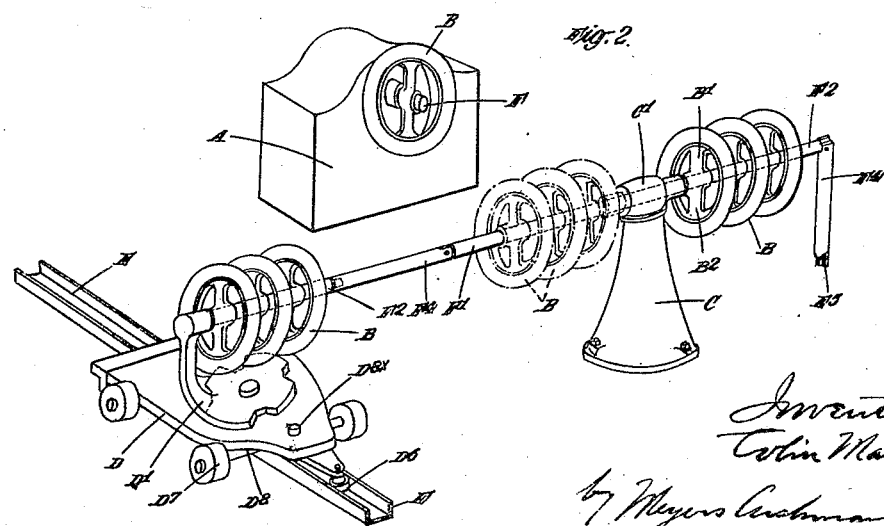

C. MACBETH.
TRANSPORTING SYSTEM PARTICULARLY FOR USE IN CONNECTION WITH THE MANUFACTURE OF TIRES.
APPLICATION FILED JUNE 9, 1919.
1,410,821.
Patented Mar. 28, 1922.
5 SHEETS—SHEET 2.
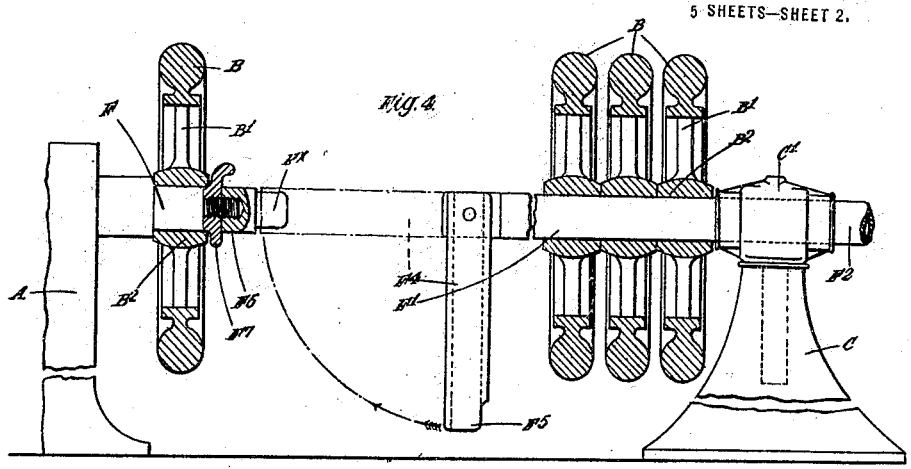
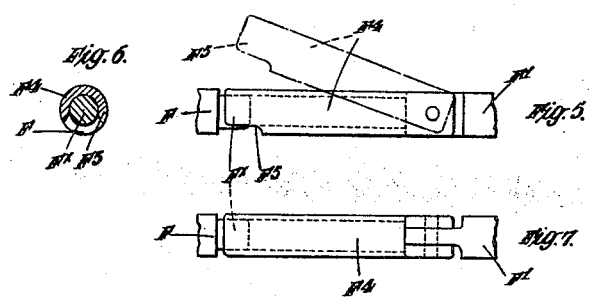
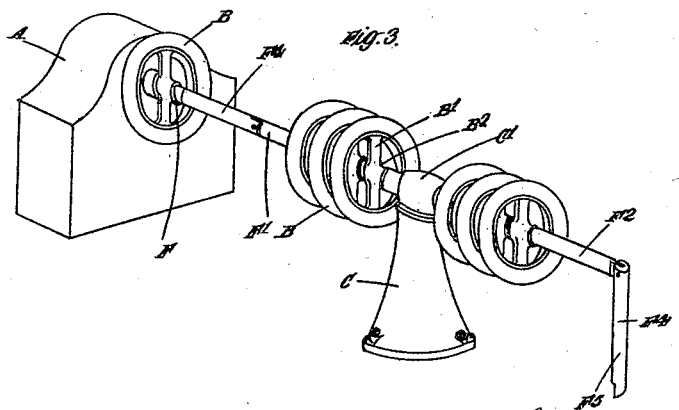

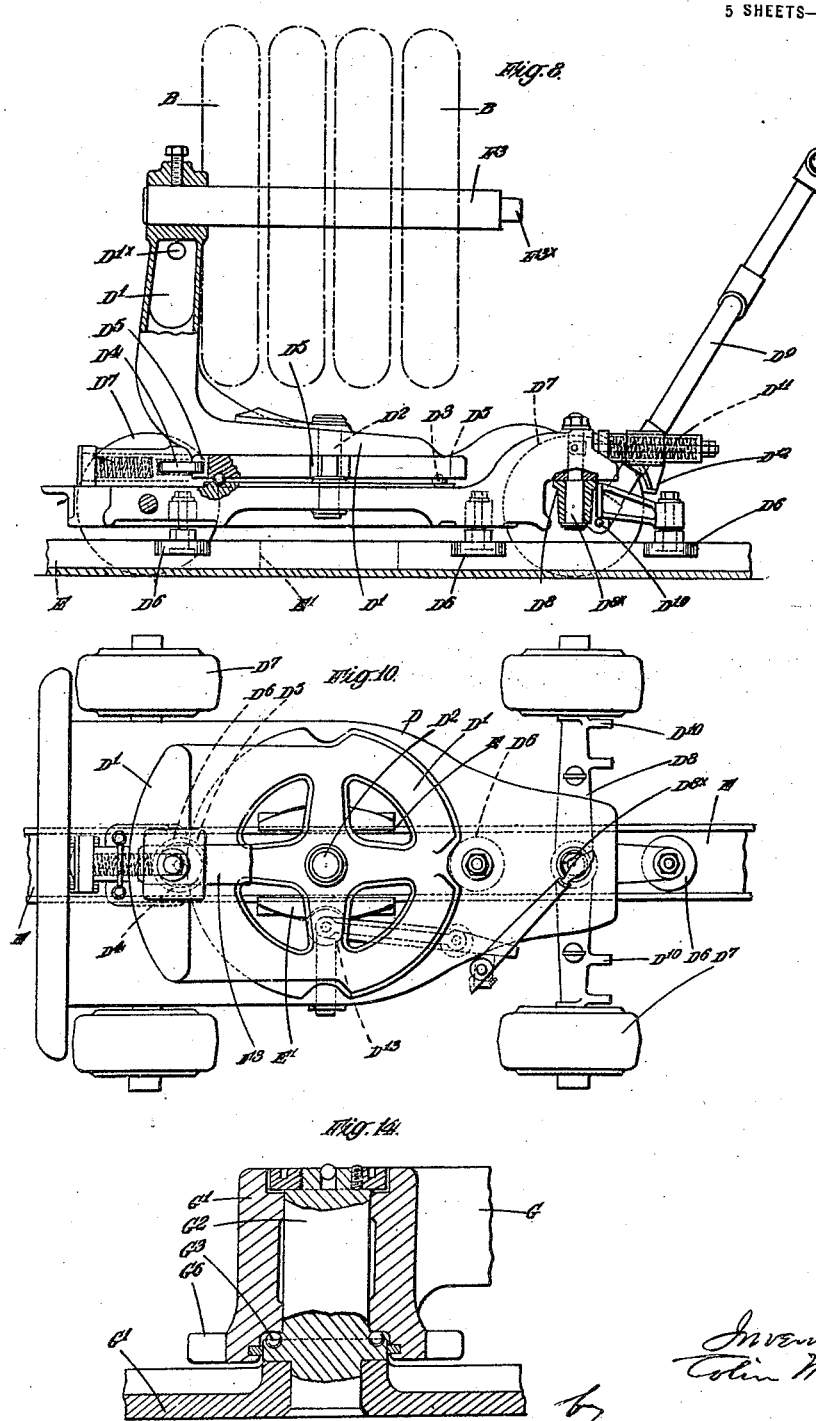

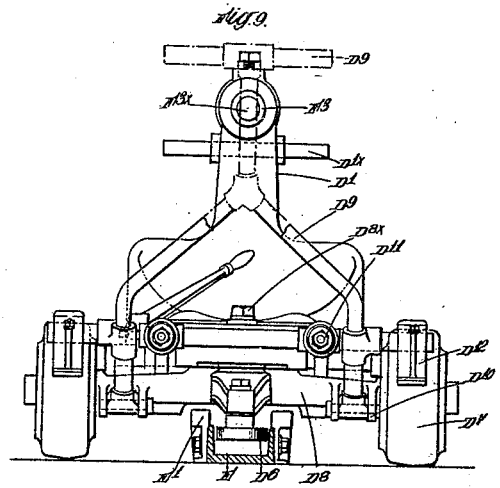
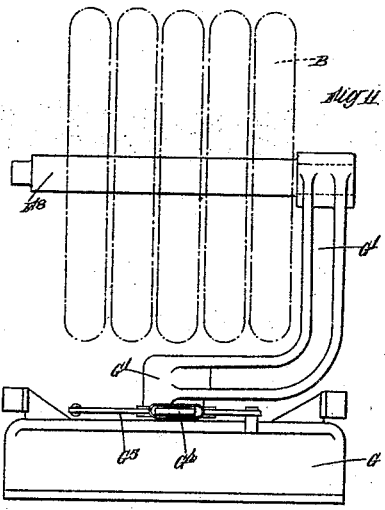
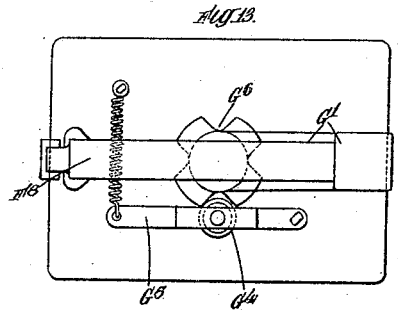

C. MACBETH.
TRANSPORTING SYSTEM PARTICULARLY FOR USE IN CONNECTION WITH THE MANUFACTURE OF TIRES.
APPLICATION FILED JUNE 9, 1919.
1,410,821.
Patented Mar. 28, 1922.
5 SHEETS—SHEET 5.
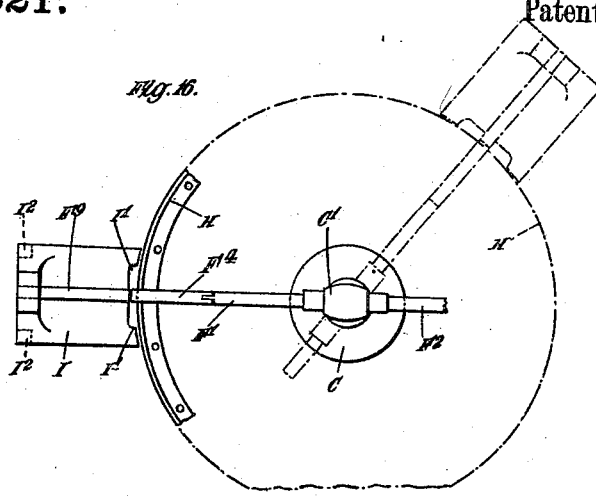
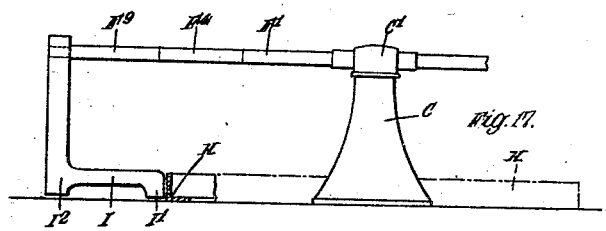
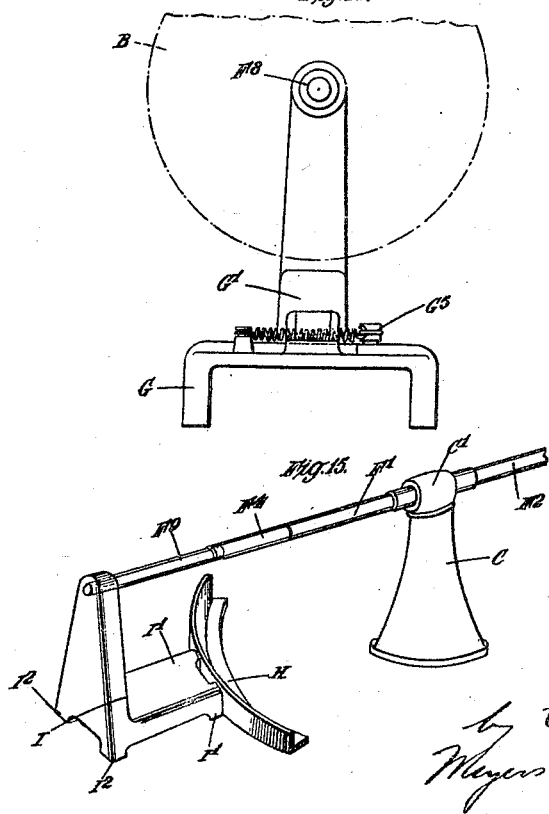

UNITED STATES PATENT OFFICE.

COLIN MACBETH, OF BIRMINGHAM, ENGLAND, ASSIGNOR TO THE DUNLOP RUBBER COMPANY, LIMITED, OF WESTMINSTER, LONDON, ENGLAND.

TRANSPORTING SYSTEM PARTICULARLY FOR USE IN CONNECTION WITH THE MANUFACTURE OF TIRES.

1,410,821.  Specification of Letters Patent.  Patented Mar. 28, 1922.

Application filed June 9, 1919. Serial No. 302,884.

*To all whom it may concern:*

Be it known that I, COLIN MACBETH, a subject of the King of Great Britain, residing at Para Mills, Aston Cross, Birmingham, in the county of Warwick, England, have invented certain new and useful Improvements in or relating to Transporting Systems Particularly for Use in Connection With the Manufacture of Tires, of which the following is a specification:—

This invention relates to transporting systems particularly for use in connection with the manufacture of tires and has special reference to the transporting of tire cores (such as those on which pneumatic tire covers or casings are built up) during the various stages of manufacture of the tires. The chief object of the present invention is to provide an improved system or method of and means for transporting or moving the cores from place to place whereby the cores need not be lifted between or during the various operations or stages of manufacture, thus avoiding considerable manual effort in moving the cores.

According to this invention, the tire cores are adapted to be supported with their axes horizontal in such a manner that they can be moved axially or horizontally whilst so supported from or on to transporting means, trucks or other supports such as may be required. For this purpose trucks, turrets or other devices may be provided with horizontal arms for supporting cores having suitable centre pieces or hubs which arms are all disposed at the same height above the floor level so as to enable them to be readily connected to the horizontal core supporting shafts or spindles of various machines or the like and thus form a horizontal rail along which the tire cores can be slidably moved say from the trucks or turrets on to the machines or the like or vice versa. The invention is especially suitable, for example, in the case of supplying cores to and delivering them from a casemaking machine and for this purpose, a suitable turret or rotary device having two or more horizontal core supporting arms, is provided adjacent to the said machine and may be used in conjunction with a wheeled truck or carrier having a horizontal core supporting arm, the system being such that the truck with a number of cores supported on its horizontal arm can be readily moved to the aforesaid turret and its arm readily connected by a connecting piece or link to one of the turret arms to enable the cores to be moved axially off the truck arm on to one of the said turret arms which after being disconnected from the truck arm, permits of the turret being angularly moved into a the aforesaid connecting piece. The cores can be aligned with and connected to the core support of the case making machine by the aforesaid connecting piece. The cores can be then individually slid or moved axially on to the core support of the said machine and after each core has been dealt with in the machine, the turret can be again angularly moved to enable another of its arms to be connected to the core support so that the core can be slid from the latter on to the turret arm connected thereto, ready to be removed after again rotating the turret by sliding on to a suitable truck for transporting the core to the place required, or on to a stocking device or stillage. The aforesaid connecting piece when not being used in the horizontal position may hang vertically from the arm to which it is hinged so as to serve for retaining the cores on that arm and thus prevent accidental or undesired displacement. The cores are preferably made with a cross or centre portion having a central hole or hub by means of which they are mounted and centred on the various supports and arms. In the case of ring cores (solid or built up) a hub or centre piece may be readily attached thereto in any appropriate manner.

In order that the said invention may be clearly understood and readily carried into effect, the same will now be described more fully with reference to the accompanying drawings, in which:—

Figure 1 is a diagrammatic general plan of one example of the invention in which trucks and a turret, having horizontal core supporting arms, are used in conjunction with a case making machine.

Figure 2 is a diagrammatic perspective view showing the horizontal arm of one of the trucks connected to a horizontal arm on the turret.

Figure 3 is a diagrammatic perspective view showing the horizontal turret arm connected to the core support of the case making machine.

Figure 4 is a side view of the arrangement shown in Figure 3 but drawn to a larger scale and showing more particularly the connection between the horizontal turret arm and the core support of the case making machine, the cores being shown in section.

Figures 5, 6 and 7 are respectively a side view, a plan and a transverse section of the hinged connecting piece on one of the core supporting arms of the turret.

Figures 8, 9 and 10 are respectively a side view (partly in section), a front view and a plan of one construction of core carrying truck.

Figures 11, 12 and 13 are respectively a side view, an end view and a plan of a stationary device or stillage for supporting the cores, and Figure 14 is a detail view of part of the device shown in Figures 11, 12 and 13, hereinafter referred to.

Figures 15, 16 and 17 are respectively a perspective view, a plan and part vertical section of a modified arrangement for feeding a turret or similar device.

A represents the case making machine, B, B indicate the tire cores, which as shown particularly in Figure 4 are provided with spoke-like members $B'$ and a central hub $B^2$. C is a turret device and D, D represent two trucks which are adapted to be guided along rails E, E situated one on each side of the case making machine. F represents the horizontal shaft or core support of the case making machine and the height of this support F above the floor determines the height of the various horizontal arms provided on the turret, trucks and other devices which may be employed. The turret C in the example shown is provided with two horizontal arms $F'$, $F^2$ supported in a rotary or angularly movable head $C'$ and each truck D is provided with a horizontal arm $F^3$. The truck which is more particularly illustrated in Figures 8, 9 and 10 comprises a base plate on which is mounted a bracket head $D'$ carrying the horizontal arm or support $F^3$. The head $D'$ is adapted to be angularly moved on a central pin $D^2$ and ball bearings $D^3$, and it can be retained in any set or located position by means of spring pressed roller $D^4$ engaging with notches $D^5$ in a circular portion forming the lower part of the angularly movable head $D'$. Thus the head $D'$ and the horizontal arm $F^3$ can be moved to and fixed in any desired position. To facilitate the angular movement of the head D, handles or projections $D'^x$ are provided thereon as shown in Figures 8 and 9. The base plate is provided with horizontally disposed wheels or rollers $D^6$ which are adapted to fit in a channel shaped rail E as shown in Figures 1, 2, 9 and 10, and the truck is supported on the floor by means of rubber tired wheels $D^7$, the front pair of which are supported on a steerable axle $D^8$ centrally mounted at $D^{8x}$ on the front part of the base plate. The truck is adapted to be pulled along by a handle $D^9$ pivoted at $D^{10}$ to the axle $D^8$, and it is connected to springs $D^{11}$ which normally maintain the handle in such a position that brake blocks $D^{12}$ carried by a suitable part on the handle are caused to bear against the front wheels $D^7$. When however the truck is being pulled along the pull on the handle $D^9$ maintains the latter in a position in which the springs $D^{11}$ are compressed and the brake blocks held out of engagement with the front wheels $D^7$ but when the handle $D^9$ is not being pulled the springs $D^{11}$ force it into a position to cause the brake blocks $D^{12}$ to engage with the front wheel $D^7$ and thus prevent unrequired movement of the truck. The truck with a suitable number of cores B supported on its arm $F^3$ is pulled along to a position adjacent to the turret C at which point notched plates $E'$ are secured to the rails and a suitably controlled spring pressed roller $D^{13}$ on the truck is adapted to engage with the notches in the said plate $E'$ to definitely locate the correct position for the truck and thus enable its arm $F^3$ to be connected to one of the turret arms say $F'$, when the turret is moved to the required position. Assuming the head $D'$ is in the position shown in Figure 8 it is angularly moved through an angle of 90° to the position shown in Figure 1 and retained therein by means of the spring pressed roller $D^4$ and the turret arm $F'$ can then be brought into alignment with the arm $F^3$ on the truck. Each turret arm carries at its outer end a hinged connecting piece $F^4$ normally suspended vertically as shown in Figures 2, 3 and 4 so as to serve as a retaining device for any cores which may be supported on the turret arms. The hinged connecting piece $E^4$ is adapted to be raised during the rotation or angular movement of the turret and by reason of a recessed end $F^5$ provided therein it can be caused to rest upon a reduced end $F^{3x}$ of the truck arm $F^3$ (see Figure 8) so as to form a horizontal connection between the truck arm and the turret arm as shown in Figure 2; as shown in Figure 4, this method of connection is also effected between either of turret arms and the core support F of the case making machine which support also has a reduced end $F^x$ to receive the recessed end $F^5$ of the connecting piece $F^4$. The cores on the truck arm can then be slidably moved from the truck arm along the connecting piece $F^4$ to the turret arm $F'$. After disconnecting the hinged connecting piece $F^4$ from the arm $F^3$ on the truck so that it is suspended as aforesaid the truck can be moved away along the rail E thus leaving a supply of cores on the turret arm F'. When it is desired to place a core on the core support F of the case making machine, the turret is turned to the required extent (say a quarter of a revolution) as shown by the arrows X in Figure 1, to bring its arm F' in alignment with the core support of the said machine, the hinged connecting piece $F^4$ having been raised so that its recessed end $F^5$ may rest on the reduced end of the core support in the machine, then forms a connection or link as aforesaid thereby enabling a core to be slid from the turret arm F' on to the core support of the machine on which latter support the core is detachably secured ready for the casing parts to be applied to the core by any suitable retaining means (such as a nut $F^6$ having tommy holes or the like for enabling it to be rotated and a washer $F^7$ having a slot for enabling it to be withdrawn from or lifted off the arm F' after the nut $F^6$ has been slackened). After the casing parts have been applied to the core, the core with the casing (hereinafter referred to as the filled core) is ready for removal from the machine, and the turret is then angularly moved to bring its other arm $F^2$ into alignment with the core support of the machine and by means of the connecting piece $F^4$ on the arm $F^2$ the core can be slid from the machine on to the arm $F^2$ after the said retaining washer $F^7$ has been removed. Another core is then supplied to the machine by again bringing the arm F' into alignment and effecting the connection and operations above mentioned, the removal from the machine of the filled cores being effected as aforesaid. By means of this arrangement the operator of the case making machine always has a supply of cores to hand, and after the desired number of filled cores have been placed on the arm $F^2$ of the turret they can be slid by means of the connecting piece $F^4$ on the arm $F^2$ on to a core support of a second truck which is guided along a second rail at the other side of the case making machine as shown in Figure 1. When any or all of the cores on the supply support of the turret have been used, a fresh supply is brought up on the truck and placed on the supply support of the turret as above described, the filled cores being removed from the turret singly or in batches as desired. Thus the case making machine operator can work uninterruptedly, as a regular supply of the cores and removal of the filled cores are ensured.

Instead of employing a second truck which is guided along a second rail as shown in Figure 1 a stocking device or stationary support may be located at the position occupied by the second truck shown in Figure 1.

A stocking device or stillage may be provided if desired in a position in alignment with the case making machine and the filled cores may be removed from the turret arm $F^2$ by sliding them along a connecting piece $F^4$ on to a horizontal arm $F^8$ mounted on the stillage. The stillage may comprise a channel section base G see Figures 1, 11 and 12 on which is mounted a bracket or head G' carrying the horizontal core supporting arm $F^8$. The lower part of the head G' is angularly movable on a pin $G^2$ and bearings $G^3$, see Figure 14, and it is adapted to be retained in a set or located position as required by means of a roller $G^4$ supported on a spring controlled pivoted lever $G^5$ and engaging with any one of the notches $G^6$ formed in the lower part of the head G'.

In the modification shown in Figures 15, 16 and 17, a rail or outstanding ring H is provided on the floor adjacent to a turret C, which rail may be continuous to form a complete circle concentric with the axis of rotation of the turret head C' as shown in dotted lines in Figure 16, or the rail may be of segmental or arcuate form, (as shown in Figure 15 and by full lines in Figure 16) that is, forming part of a circle concentric with the axis of rotation of the turret head. In this case, a core transporting truck, carrier or stillage such as I is employed, the base of which may be provided with supporting parts or feet I', I', $I^2$, $I^2$ which base has an upwardly extending part carrying a core supporting arm $F^9$ parallel with the longitudinal axis of the base. If desired the base may be provided with wheels of the castor type but in any case the parts I', I' are provided and serve for enabling the truck or stillage to be located in the proper position relatively to the turret by bringing the said parts I', I against the rail or ring H as shown in Figures 15 and 16. Thus the truck or stillage can be placed at any point along or around the ring or segment stop H and in whatever position it is placed against this stop or ring the core supporting arm $F^9$ will always be radial with respect to the axis of rotation of the turret head so that either of the turret arms may be connected to the core supporting arm $F^9$ by means of a hinged connecting piece $F^4$ as hereinbefore described, for the purpose of enabling the sliding movement of the cores from the truck or stillage on to the turret arm or vice versa to be effected. By means of this arrangement no fixed or definite loading or discharging position is necessary and moreover guide rails such as E and a revolving or angular movable head on the truck or stillage can be dispensed with.

The system and apparatus above set forth are equally applicable in the cases of making beaded edge covers or wired edge covers on solid or on segmental cores and in the latter instance the cores may be fitted with readily attachable metal centering discs or spiders to form the support or hubs thus permitting of the same system and plant being used in both cases.

In some cases the revolving turret need not be used, as a truck having two supports may be provided, one for supplying the cores direct to the case making machine and the other for receiving the filled cores direct from the machine by sliding motions as aforesaid, the truck being constructed as a movable revolving turret or being otherwise movable to supply and receive the cores.

Instead of employing wheeled trucks as hereinbefore described we may provide barrel transporting devices having horizontal core supporting arms as set forth in the specification of our concurrent British application No. 16689 of 1918.

The improved system is applicable to the various operations known as core stripping, core cleaning, core solutioning, core washing, case rubbering, case examining, etc.

What I claim and desire to secure by Letters Patent of the United States is:—

1. Means for transporting articles of the character described each having a central hub, comprising a plurality of devices each provided with a horizontal arm shaped to receive the hubs of the aforesaid articles and support the articles vertically, all of said arms being in the same horizontal planes, and means for effecting relative movement between said devices and aligning the horizontal arms of two of them, whereby the articles can be axially moved and transferred from one said device to the other without being moved vertically.

2. Means for transporting articles of the character described each having a central hub, comprising a plurality of devices adapted to carry or support said articles, horizontal arms fixed on said devices at the same distance from the ground or floor level and adapted to receive the hubs of said articles so that a plurality thereof can be supported vertically on any one of the said arms, and means for connecting the arms of two said devices to form a continuous horizontal rail along which the articles may be axially moved from one device to another without being lifted.

3. Means for transporting articles of the character described each having a central hub, comprising a plurality of devices each having a horizontal arm adapted to receive the hubs of said articles and support the latter vertically, said arms being fixed at the same distance from the ground or floor level, means for rotating one of said arms around a vertical axis, and means for connecting the free end of said rotatable arm with the aligned arm of any of the other devices so as to form a horizontal rail along which the articles can be axially moved and transferred from one device to another without being lifted.

4. Means for transporting articles of the character described each having a centrally arranged hub, comprising a plurality of devices each including a horizontal arm adapted to receive the hubs and support the articles vertically, all of said arms being in the same horizontal planes, and means adapted to connect any two aligned arms and form a horizontal rail along which the articles may be axially moved without being lifted in order to transfer them from one of the said arms to the other.

5. Means for transporting articles of the character described each having a centrally arranged hub, comprising a plurality of devices each having a horizontal arm adapted to receive the hubs and support the articles vertically, certain of said arms having their outer ends pivotally connected to the body thereof, whereby they can be adjusted into alignment with one of the other arms to provide a continuous rail along which the articles can be transferred from one device to another.

6. Means for transporting articles of the character described each having a centrally arranged hub, comprising a plurality of devices each having a horizontal arm adapted to receive the hubs and support the articles vertically, all of said arms being arranged in the same horizontal planes and certain of them being provided with hinged portions which can be placed in a horizontal position and connected to the end of another arm to form a connecting link between the two arms and provide a continuous horizontal rail along which the articles can be axially moved and transferred from one device to another without being lifted.

7. Means for transporting articles of the character described each having a hub, comprising a plurality of devices each having a horizontal arm situated at the same distance from the ground or floor level and adapted to receive the hubs and support the articles vertically, one of said devices being provided with means for angularly moving its arm around a vertical axis, said angularly movable arm having an adjustable section at its outer end adapted to be placed in alignment with the arm of any of the other devices to form a continuous horizontal rail along which the articles can be slidably moved in an axial direction from one device to another.

8. The combination with a tire working machine having a horizontal spindle or arm, of a device having a horizontal tire supporting arm at the same distance above the floor level as the horizontal arm or spindle of the tire working machine, and means for connecting the two arms to form a continuous horizontal rail along which the tires can be transferred from the device on to the spindle of the tire working machine or vice versa.

9. The combination with a tire working machine having a horizontal spindle or arm for supporting a tire core, of a device having a horizontal core supporting arm rotatable around a vertical axis, and means for connecting said arms when the rotatable arm is aligned with the said machine arm to provide a support along which tire cores can be axially moved to or from the machine.

10. The combination with a tire case making machine having a horizontal arm or spindle, of means for supplying tire cores to the machine comprising a carrier having a horizontal core supporting arm, and a movable transfer means having a horizontal core supporting arm, all of said horizontal arms being disposed at the same distance above the ground or floor level whereby the transfer arm can be positioned in alignment with and form a continuation of either the machine spindle or carrier arm for the purpose described.

11. The combination with a tire working machine including a horizontal tire core support, of a truck provided with a horizontal arm adapted to support a plurality of tire cores, and a transfer means including a tire core support adapted to be successively aligned with the truck arm and the machine core to form a continuous rail along which cores can be axially moved from the truck to the transfer means and from the latter on to the support of the machine.

12. The combination with a tire working machine including a horizontal tire core support, of a truck having a horizontal support adapted to receive a plurality of tire cores, and a turret having two arms or supports adapted to form continuations of the core supports of the machine and truck, whereby cores may be moved axially from the truck to said turret and from the latter to the machine.

13. The combination with a tire working machine, of a movable carrier adapted to transport tire cores to be supplied to the machine, a second movable carrier adapted to receive tires after treatment by said machine, and means whereby the cores may be transferred from the supply carrier to the machine and from the latter to the delivery carrier by a sliding movement only.

14. The combination with a tire working machine adapted to operate on a tire core arranged with its axis in a horizontal position, a carrier for supplying tire cores to said machine having means for supporting a core with its axis in the same horizontal plane as the axis of the core support of the machine, a delivery carrier having means for supporting tires on an axis in the same horizontal plane as the axis of the core support of the machine, and means for transferring cores from the supply carrier to the machine and from the latter to the delivery carrier requiring only an axial sliding movement of the articles.

15. The combination with a tire working machine including a horizontal tire core support of a truck having an angularly movable head provided with a laterally projecting horizontal tire core support, means for securing said head in any adjusted position, and means for transferring cores from the truck to said machine including an arm adapted to form successively a continuation of the core supports of the truck and machine.

16. The combination with a tire working machine including a horizontal tire core support, of a truck movable along a fixed guide and provided with a horizontal tire core support, means for transporting cores across the space separating the truck and machine including an arm adapted to be positioned to form a continuation of both said tire supports, means for determining when the truck is in position to properly cooperate with said transfer means, and means for securing the truck in such position.

COLIN MACBETH.